(12) United States Patent
Iwabuchi et al.

(10) Patent No.: US 6,899,962 B2
(45) Date of Patent: May 31, 2005

(54) EUROPIUM ACTIVATED CESIUM BROMIDE PHOSPHOR AND RADIATION IMAGE STORAGE SHEET

(75) Inventors: Yasuo Iwabuchi, Kanagawa (JP); Yuji Isoda, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 52 days.

(21) Appl. No.: 10/673,446

(22) Filed: Sep. 30, 2003

(65) Prior Publication Data

US 2004/0061093 A1 Apr. 1, 2004

Related U.S. Application Data

(63) Continuation of application No. 09/887,344, filed on Jun. 25, 2001, now abandoned.

(30) Foreign Application Priority Data

Jun. 23, 2000 (JP) ........................................ 2000-189798
Jul. 4, 2000 (JP) ........................................ 2000-202496

(51) Int. Cl.⁷ ............................ C09K 11/61; G21K 4/00
(52) U.S. Cl. .................... 428/690; 428/913; 250/484.4; 252/301.4 H
(58) Field of Search ................................ 428/690, 913; 250/484.4, 581, 584; 252/301.4 H; 313/503, 504

(56) References Cited

U.S. PATENT DOCUMENTS

| | | | | |
|---|---|---|---|---|
| 4,891,277 A | * | 1/1990 | Nakamura | 428/691 |
| 5,540,859 A | * | 7/1996 | Nakamura et al. | 252/301.4 H |
| 5,646,412 A | * | 7/1997 | Bryan et al. | 250/483.1 |
| 6,501,088 B1 | | 12/2002 | Struye et al. | 250/585 |
| 6,802,991 B2 | * | 10/2004 | Devenney et al. | 252/301.4 H |
| 2002/0104974 A1 | * | 8/2002 | Hosoi | 250/584 |
| 2004/0001953 A1 | * | 1/2004 | Struye et al. | 428/408 |

FOREIGN PATENT DOCUMENTS

| | | | |
|---|---|---|---|
| EP | 1065523 | * | 1/2001 |
| JP | 2001-075209 | * | 3/2001 |
| JP | 2001-075210 | * | 3/2001 |

* cited by examiner

*Primary Examiner*—Camie S. Thompson
(74) *Attorney, Agent, or Firm*—Birch, Stewart, Kolasch & Birch, LLP

(57) ABSTRACT

An europium activated cesium bromide phosphor having the formula of CsBr:xEu [$0<x\leq0.2$], in which a relationship between an emission intensity ($I_E$) of $Eu^{2+}$ and a coloring intensity ($I_P$) at $F(Br^-)$ center satisfies the condition of $0.2 \leq I_E \times I_F$, and/or in which a ratio of $Eu^{2+}$ to $Eu^{3+}$ contained in the phosphor in terms of emission intensity satisfies the condition of $5\times10^{-5} \leq Eu^{3+}/Eu^{2+} \leq 0.1$ gives an increased stimulated emission amount and is favorably employed for producing a radiation image storage sheet.

14 Claims, 5 Drawing Sheets

EUROPIUM ACTIVATED CESIUM BROMIDE PHOSPHOR AND RADIATION IMAGE STORAGE SHEET

This application is a Continuation of prior application Ser. No. 09/887,344 filed on Jun. 25, 2001 now abandoned, on which priority is claimed under 35 U.S.C. § 120, which claims priority under 35 U.S.C. § 119(a) on Patent Application No(s). 2000-189798 and 2000-202496 filed in Japan on Jun. 23, 2000 and Jul. 4, 2000.

FIELD OF THE INVENTION

The present invention relates to an europium activated cesium bromide phosphor and a radiation image storage sheet utilizing the phosphor.

BACKGROUND OF THE INVENTION

As a method replacing a conventional radiography, a radiation image recording and reproducing method utilizing a stimulable phosphor was proposed and has been practically employed. The method employs a radiation image storage sheet comprising a support and a stimulable phosphor layer (i.e., stimulable phosphor sheet), and comprises the steps of causing the stimulable phosphor to absorb radiation energy having passed through an object or having radiated from an object; sequentially exciting the stimulable phosphor with an electromagnetic wave such as visible light or infrared rays (hereinafter referred to as "stimulating rays") to release the radiation energy stored in the phosphor as light emission (i.e., stimulated emission); photoelectrically detecting the emitted light to obtain electric signals; and reproducing the radiation image of the object as a visible image from the electric signals. The storage sheet thus treated is subjected to a step for erasing a radiation image remaining therein, and then stored for the next recording and reproducing procedure. Thus, the radiation image storage sheet can be repeatedly employed.

The stimulable phosphor emits stimulated emission when excited with stimulating rays after having been exposed to a radiation, and a practically used one gives a stimulated emission in the wavelength region of 300 to 500 nm when irradiated with stimulating rays in the wavelength region of 400 to 900 nm. A typical example of the stimulable phosphor conventionally used in a radiation image storage sheet is an alkali halide phosphor.

For example, Japanese Patent Publication Nos. 7-84588 and 7-84589 disclose CsX and RbX (X: halogen) phosphors. These publications, however, give any information about neither defects of the halogen atom and an amount of $Eu^{2+}$ activator in the phosphor nor the valency of the activating element, particularly, valency of europium (Eu).

The radiation image storage sheet has a basic structure comprising a support and a stimulable phosphor layer provided thereon. If the phosphor layer is self-supporting, the support may be omitted. In general, a transparent protective film of polymer material is placed on the free surface (i.e., surface not facing the support) of the phosphor layer.

The phosphor layer usually comprises a binder and stimulable phosphor particles dispersed therein, but it may consist of agglomerated phosphor without binder. The phosphor layer containing no binder can be formed by deposition process or firing process. Further, the phosphor layer comprising agglomerated phosphor soaked with a polymer is also known. In any of these phosphor layers, the stimulable phosphor emits stimulated emission when excited with stimulating rays after having been exposed to a radiation such as X-ray. The radiation having passed through an object or radiated from an object is absorbed by the phosphor layer of the storage sheet in proportion to the applied radiation dose, and accordingly a radiation image of the object is produced in the storage sheet in the from of a radiation energy-stored image. Thus imagewise stored radiation energy can be released as stimulated emission by sequentially irradiating the storage sheet with stimulating rays. The stimulated emission is then photoelectrically detected to give electric signals, so as to reproduce a visible image from the signals.

The radiation image recording and reproducing method (i.e., radiation image forming method) is very advantageous as described above, and it is desired for the radiation image storage sheet employed in the method to have a high sensitivity and give an image of high quality (high sharpness, high graininess).

SUMMARY OF THE INVENTION

It is an object of the present invention to provide an europium activated cesium bromide phosphor which emits an increased amount of stimulated emission.

Further, it is another object of the invention to provide a radiation image storage sheet having high sensitivity.

The applicants have studied about the europium activated cesium bromide phosphor, and finally found that the amount of $Eu^{2+}$ (luminescence center) and the number of defects of Br (electron trap) give great effect on the amount of stimulated emission and further found that a ratio of emission strength of $Eu^{3+}$ to $Eu^{2+}$ ($Eu^{3+}/Eu^{2+}$) preferably is as low as possible to a certain extent.

Accordingly, the present invention resides in an europium activated cesium bromide phosphor having the formula (I):

CsBr:xEu     (I)

in which x is a number satisfying the condition of $0 < x \leq 0.2$, wherein a relationship between an emission intensity of $Eu^{2+}$ and a coloring intensity at $F(Br^-)$ center satisfies the following condition:

$$0.2 \leq I_E \times I_F$$

in which $I_E$ and $I_F$ represent the emission intensity and the coloring intensity, respectively.

The coefficient x in the formula (I) means the content of Eu in the phosphor. Since the components slightly change during the firing step of the process for preparing the phosphor, the component ratio of raw materials of the phosphor before the firing step often differs from that in the produced phosphor.

In this specification, the term 'emission intensity ($I_E$) of $Eu^{2+}$' means a maximum spontaneous emission intensity emitted by $Eu^{2+}$ in the phosphor. The value of $I_E$ is normalized by a maximum emission intensity of a reference phosphor $(SrCaBa)_5(PO_4)_3Cl:Eu^{2+}$ [NP-105 (trade name), Nichia Chemicals Co., Ltd.], which emits luminescence in the same wavelength region, as the phosphor of the invention. Accordingly, $I_E$ is a relative value of the maximum instant emission intensity from $Eu^{2+}$ provided that the emission intensity of $(SrCaBa)_5(PO_4)_3Cl:Eu^{2+}$ is set at 100.

The term 'coloring intensity ($I_F$) at $F(Br^-)$ center' is represented by $-\log(I_s/I_o)$ in which $I_o$ represents an intensity of light scattered by the phosphor before exposed to X-rays and $I_s$ represents an intensity of light scattered by the phosphor after exposed to a sufficient amount of X-rays. The value $I_F$ corresponds to the number of defects present in Br.

The present invention also resides in an europium activated cesium bromide phosphor having the formula (X):

CsBr:xEu  (I)

in which x is a number satisfying the condition of $0 < x \leq 0.2$, wherein a ratio of $Eu^{3+}$ to $Eu^{2+}$ contained in the phosphor in terms of emission intensity satisfies the following condition:

$5 \times 10^{-5} \leq Eu^{3+}/Eu^{2+} \leq 0.1$.

It is preferred that the ratio satisfies the condition of $1 \times 10^{-4} \leq Eu^{3+}/Eu^{2+} \leq 1 \times 10^{-2}$.

In the europium activated cesium bromide phosphor of the invention, the emission intensity of $Eu^{2+}$ can be determined by measuring a peak strength of spontaneous emission at approx. 450 nm which emits upon irradiation with a light at a wavelength of 346 nm, while the emission intensity of $Eu^{3+}$ can be determined by measuring a peak strength of spontaneous emission at approx. 595 nm which emits upon irradiation with a light at a wavelength of 394 nm.

The europium activated cesium bromide phosphor of invention preferably is in the form of prismatic crystals.

DETAILED DESCRIPTION OF THE INVENTION

Figure 1:
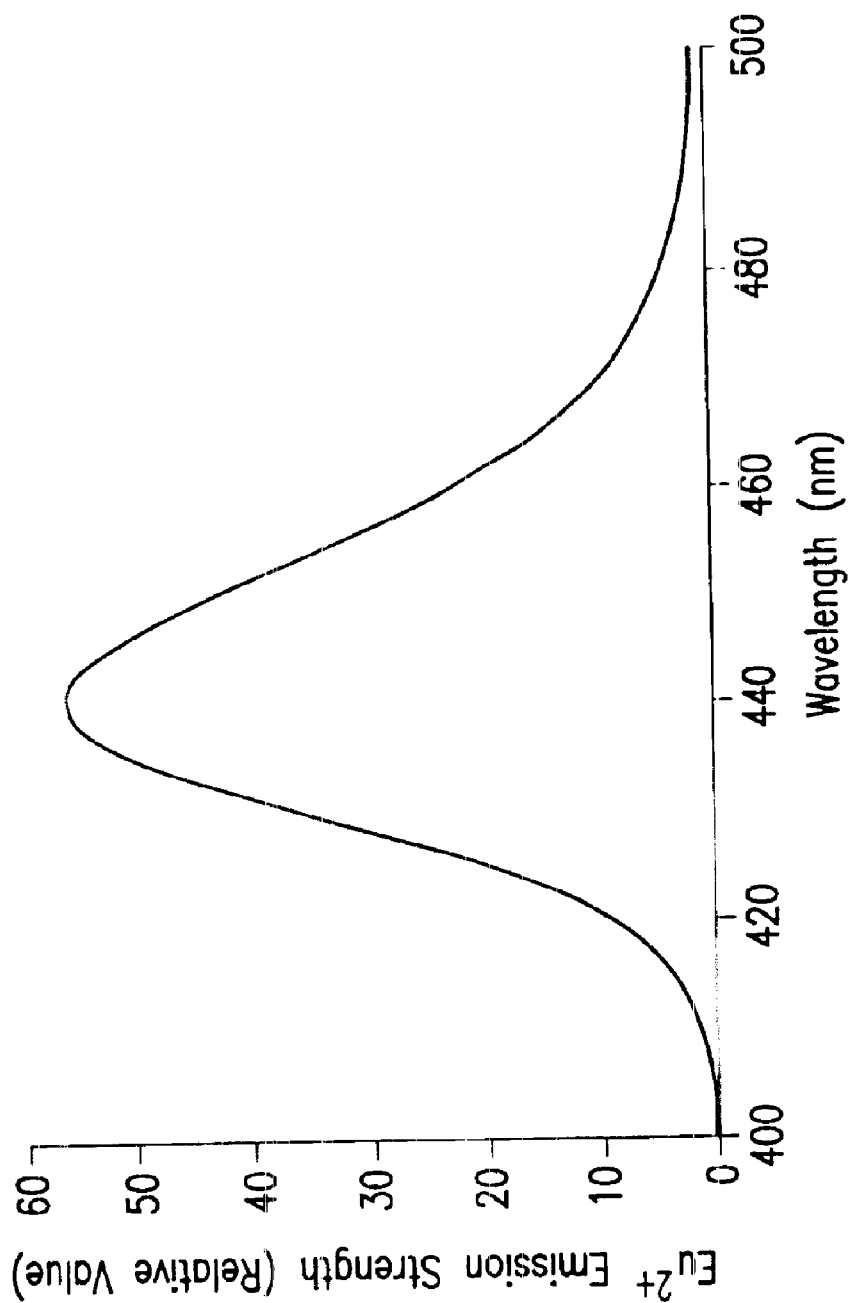
FIG. 1 shows an emission spectrum from $Eu^{2+}$ in CsBr:0.01Eu phosphor of the invention.

The europium activated cesium bromide phosphor of the invention can be prepared, for example, in the following manner.

In the first place, cesium bromide and europium bromide are prepared as starting materials. Then, the starting materials are well mixed under solid phase by means of various known mixing apparatuses. For improving the characteristics of stimulated emission, metal oxides such as aluminum oxide, silicon dioxide and zirconium dioxide may be added, if desired, to the mixture in an amount of not more than 0.5 mol., per one of the phosphor material. In addition, halides of alkali metals (e.g., Li, Na, K, Rb), alkaline earth metals (e.g., Mg, Ca, Sr) and/or trivalent metals (e.g., Y, La, Al, Ga, In, Ti) may be added in an amount of not more than 0.5 mol., per one of the phosphor material.

The mixture is then placed in a heat-resistance container such as an alumina crucible or a quartz boat, and fired in an electric furnace. The temperature for the firing is preferably in the range of 100 to 620° C., and particularly preferred is nearly 525° C. As the firing atmosphere, a nitrogen gas atmosphere, a nitrogen gas atmosphere containing a small amount of oxygen gas or hydrogen gas, or an oxygen gas atmosphere can be employed. Preferred is a nitrogen gas atmosphere or a nitrogen gas atmosphere containing a small amount of oxygen gas. The firing period is determined upon various conditions such as the amount of the mixture charged in the container, the firing temperature and the temperature at which the product is taken out of the furnace, but generally in the range of 0.1 to 10 hours, preferably 0.5 to 5 hours.

The produced phosphor can be subjected to known treatments such as pulverizing and sieving, if needed.

Thus, the europium activated cesium bromide phosphor which is a stimulable phosphor and has the following formula (I) can be prepared.

CsBr:xEu  (I)

in which x is a number satisfying the condition of $0 < x \leq 0.2$.

The activator of the europium activated cesium bromide phosphor of the invention is in the form of $Eu^{2+}$ or $Eu^{3+}$. In the process for preparation of the phosphor, all the starting materials for the activator are not always incorporated as the activating components of the resultant phosphor. Accordingly, in the phosphor prepared under some conditions, the total amount of Eu is slightly different from the amount of $Eu^{2+}$. The amount of stimulated emission generally increases in proportion to the amount of luminescence center $Eu^{2+}$ in the phosphor up to a certain limit. In the present invention, the amount of $Eu^{2+}$ is determined by a maximum instant emission intensity of $Eu^{2+}$ in the phosphor. The maximum instant emission intensity of $Eu^{2+}$ ($I_E$) is normalized by that of a reference phosphor which emits luminescence in the same wavelength region [$(SrCaBa)_5(PO_4)_3C:Eu^{2+}$, NP-105 (trade name), Nichia Chemicals Co., Ltd. in a sufficient concentration to absorb exciting rays].

Accordingly, the value $I_E$ is a relative value of the maximum instant emission intensity from $Eu^{2+}$ provided that the maximum emission intensity of $(SrCaBa)_5(PO_4)_3Cl:Eu^{2+}$ is set at 100. The higher the value $I_E$ is, the more amount of $Eu^{2+}$ the phosphor is present.

The amount of stimulated emission of the above phosphor also increases in proportion to the number of defects of electron trap Br. In the invention, the number of defects of Br is determined by coloring intensity [$I_F$] at $F(Br^-)$ center caused by exposure to X-rays. The coloring intensity [$I_F$] is defined as $-\log(I_s/I_o)$ in which $I_o$ represents an intensity of light scattered by the phosphor before exposed to X-rays and $I_s$ represents an intensity of light scattered by the colored phosphor after exposed to X-rays. The higher the value $I_s$ is (namely, the thicker the phosphor is colored), the more defects of Br the phosphor are present.

Although both the amount of $Eu^{2+}$ and the number of Br defects increase the amount of the stimulated emission, the emission can not be sufficiently enhanced only by one of them. Only when both of them are enough present in the phosphor, the amount of the stimulated emission remarkably increases. In fact, the europium activated cesium bromide phosphor of the invention releases the stimulated emission in a remarkably increased amount when the emission intensity $I_E$ of $Eu^{2+}$ and the coloring intensity $I_F$ satisfy the condition of $0.2 \leq I_E \times I_F$. It is preferred that these values satisfy the condition of $0.5 \leq I_E \times I_F \leq 30.0$, and more preferably satisfy the condition of $10.0 \leq I_E \times I_F \leq 15.0$.

The radiation image storage sheet of the invention has a phosphor layer (or film) comprising an europium activated cesium bromide phosphor of the formula (I).

The phosphor layer is usually formed by a vapor-phase deposition method, and hence usually comprises the phosphor in the form of prismatic crystals. The phosphor layer may further contain other stimulable phosphors. Furthermore, the storage sheet of the invention may have another phosphor layer containing other phosphors such as a phosphor absorbing radiation energy to emit visible or ultraviolet light. As an example for preparation of the radiation image storage sheet of the invention, the process for preparing the storage sheet having a phosphor layer formed on a support by a vapor-phase deposition method is described below.

The support employed in the invention can be optionally selected from those employed in the conventional radiation image storage sheets. Preferred examples of the support include sheets of quartz, glass, metals (e.g., aluminum, iron, tin, chromium) and resins (e.g., aramide). For improving sensitivity or image quality (such as sharpness or graveness) of the storage sheet, it is known to provide a light-reflecting layer containing light-reflecting material such as titanium dioxide or a light-absorbing layer containing light-absorbing material such as carbon black. These auxiliary layers may be optionally formed on the support. Further, for improving the sharpness of the resultant radiation image, fine hollows may be formed on the phosphor layer-side surface of the support or on the phosphor layer-side surface of the auxiliary layer such as an adhesive layer, the light-reflecting layer or the light-absorbing layer, if provided.

In the case where the phosphor layer is formed by a vacuum deposition method, firstly the support is placed in a container of vacuum deposition apparatus. After the container is evacuated to approx. $1.33 \times 10^{-4}$ Pa, the stimulable phosphor is heated and evaporated by a resistance heating method or an electron beam method to be deposited on the support until a phosphor layer having the desired thickness is formed. The vacuum deposition may be repeated for several times, and different phosphors may be co-deposited using two or more resistance heaters or electron beams. Further, it is also possible to form the phosphor layer on the support simultaneously with preparing the phosphor from the starting materials. The support (or a protective layer formed on the support) way be cooled or heated, while the phosphor is deposited on it. After the vacuum deposition is complete, the formed (deposited) phosphor layer may be subjected to a heating (anile) treatment. The treatment is carried out, for example, at a temperature of 50 to 600° C. for a few hours under nitrogen gas (which may contain a small amount of oxygen or hydrogen gas) atmosphere.

If the electron beam method is adopted, firstly the aforementioned stimulable phosphor or a mixture of its starting materials is pressed to prepare a tablet as an evaporation source. The pressure is determined according to character and a state of the phosphor, and is generally in the range of 800 to 11000 kg/cm$^2$. The phosphor or the materials may be heated at a temperature of 30 to 200° C. during the pressing. The formed tablet is preferably degassed after pressed. Thus prepared tablet has a relative density of 80 to 98%, preferably 90 to 96%. From the surface of the tablet, the phosphor can be uniformly evaporated.

The tablet of the stimulable phosphor (evaporation source) and the support (on which the phosphor is deposited) are placed in a container of vacuum deposition apparatus, and the container is evacuated to approx. $1.33 \times 10^{-2}$ to $1.33 \times 10^{-4}$ Pa. While that vacuum is kept, an inert gas such as Ar or Ne gas may be introduced. The distance between the evaporation source and the support is set in the range of 5 to 150 cm. An electron beam is generated by an electron gun at an accelerating voltage of 1.5 to 5.0 kV (preferably 2.0 to 4.0 kV), and applied on the source. By exposing to the electron beam, the stimulable phosphor is evaporated, and deposited on the surface of the support. The rate of deposition of phosphor (namely, the deposition rate) is generally in the range of 1 to 1,000 $\mu$m/min., preferably in the range of 1 to 100 $\mu$m/min. After the vacuum deposition is complete, the formed phosphor layer may be subjected to a heating treatment. The treatment is carried out, for example, at a temperature of 50 to 600° C. for 1 to 3 hours under nitrogen gas (which may contain a small amount of oxygen or hydrogen gas) atmosphere.

In the case that the phosphor layer is formed by a sputtering method, firstly the support is placed in a container of sputtering apparatus. After the container is once evacuated to approx. $1.33 \times 10^{-4}$ Pa, an inert gas for sputtering (e.g., Ar or Ne gas) is introduced to approx. 0.133 Pa. The stimulable phosphor is set as a target, and the gas is ionized by discharging. The phosphor is sputtered and deposited on the support until a phosphor layer having the desired thickness is formed. The sputtering may be repeated for several times, and different phosphors may be simultaneously or sequentially sputtered from two or more targets to form two or more phosphor layers. Further, it is also possible to form the phosphor layer on the support simultaneously with preparing the phosphor by sputtering the starting materials simultaneously or sequentially. If needed, $O_2$ or $H_2$ gas may be introduced into the apparatus to perform reactive sputtering. The support (or a protective layer formed on the support) may be cooled or heated while the sputtering is performed. After the sputtering is completed, the formed (deposited) phosphor layer may be subjected to a heating (anile) treatment.

Thus, the phosphor layer comprising prismatic crystals of the stimulable phosphor growing along the thickness direction can be obtained. This phosphor layer does not contain any binder and consists of the stimulable phosphor alone. In the phosphor layer, there are cracks among the prismatic crystals of the stimulable phosphor. The thickness of the phosphor layer can be selected according to characteristics of the storage sheet and conditions of the vapor-phase deposition method, but is generally in the range of 100 $\mu$m to 1 mm (preferably, 200 to 700 $\mu$m). It is not necessary to form the phosphor layer directly on the support from the vapor phase. For example, the phosphor layer may be prepared by the steps of forming a phosphor film on a temporary support (e.g., glass plate, metal plate, plastic sheet) from the vapor phase, peeling off the formed sheet, and then providing the film onto a desired support with adhesive.

The phosphor layer may comprise a binder resin and the phosphor particles dispersed therein. In that phosphor layer, other stimulable phosphors and/or additives such as colorant may be incorporated. The phosphor layer can be formed, for example, in the following known manner. First, the stimulable phosphor and a binder are added in an appropriate organic solvent, and mixed well to prepare a coating dispersion in which the phosphor particles are uniformly dispersed in an organic binder resin solution. The binder employed in the invention can be optionally selected from those known and employed in the conventional radiation image storage sheets. The ratio between the binder and the phosphor in the coating liquid is generally in the range of 1:1 to 1:100 (binder:phosphor, by weight), preferably in the range 1:8 to 1:40 (by weight). Thus prepared coating liquid is homogeneously applied on a support by known coating means (such as doctor blade, roll coater, and knife coater).

The formed layer is then dried to form a stimulable phosphor layer. The thickness of the phosphor layer is designed according to the characteristics of the phosphor, the desired characteristics of the storage sheet and the mixing ratio of binder and phosphor, but generally in the range of 20 $\mu$m to 1 mm, preferably 50 $\mu$m to 500 $\mu$m. The phosphor layer may be formed by other steps, namely, coating the coating dispersion on a temporary support, drying the coated dispersion to form a phosphor film, peeling off the phosphor film, and then providing the phosphor film with adhesive or by pressing onto the support.

On the phosphor layer, the protective film is preferably provided so as to avoid deterioration of the sheet and/or to improve handling in conveying the sheet. The protective film preferably is transparent so as not to affect transmission of the stimulating rays and the stimulated emission. Further, the protective film preferably has enough chemical stability, enough moisture resistance and enough physical strength to protect the storage sheet from chemical deterioration or physical shock. The protective film can be formed, for example, by the aforementioned vacuum deposition method such as the electron beam method. The conditions of the method are, for example, a vacuum degree of $1.33 \times 10^{-2}$ to $1.33 \times 10^{-4}$ Pa, a distance between the evaporation source and the support in the range of 5 to 150 cm, an accelerating voltage of 1.5 to 5.0 kV and a deposition rate of approx. 1 μm/min.

Otherwise, the protective film can be formed by coating the phosphor layer with a solution containing a transparent polymer material (e.g., cellulose derivatives, polymethyl methacrylate) dissolved in an appropriate solvent, or by fixing a beforehand prepared transparent film (e.g., glass plate, a film of polymer material such as polyethylene terephthalate) on the phosphor layer with adhesion. The protective film may be formed by coating a solution of organic solvent-soluble fluorocarbon resin dispersing powder of perfluoro-olefin resin or silicone resin. The thickness of the protective film generally is in the range of 0.1 to 20 μm.

Thus, the radiation image storage sheet of the invention can be obtained. The storage sheet of the invention include various known variations. For example, for improving the sharpness of the resultant image, at least one of the aforementioned layers may be colored with a colorant which does not absorb the stimulated emission but the stimulating rays.

The present invention is further described by the following examples.

EXAMPLE 1

Preparation of CsBr:0.01Eu Phosphor 15 g (0.07 mol.) of cesium bromide and 0.2761 g ($7.0 \times 10^{-4}$ mol.) of europium bromide were weighed and mixed in a mixer. The obtained mixture was charged in a quartz container, and placed in an electric furnace. The furnace was then evacuated (first evacuation) and filled with nitrogen gas of atmospheric pressure. After the mixture was fired at 525° C. for 1 hour, the furnace was evacuated again for 5 minutes (second evacuation) and then filled with oxygen gas of 133 Pa. Further, nitrogen gas was introduced to the furnace until the inner pressure reached atmospheric pressure. After the mixture in thus treated furnace was again fired at the same temperature for 1 hour, the furnace was evacuated. The product in the furnace was cooled to room temperature. The cooled product was taken out of the furnace, and pulverized in a mortar to prepare the desired europium activated cesium bromide phosphor particles.

EXAMPLE 2

Preparation of CsBr:0.01Eu Phosphor

The procedure of Example 1 was repeated except that the furnace after the second evacuation was filled with oxygen gas of not 133 Pa but 266 Pa, to prepare europium activated cesium bromide phosphor particles.

EXAMPLE 3

Preparation of CsBr:0.01Eu Phosphor

The procedure of Example 1 was repeated except that the mixture was fired for 2 hours under nitrogen gas atmosphere without performing the second evacuation, to prepare europium activated cesium bromide phosphor particles.

EXAMPLE 4

Preparation of CsBr:0.01Eu Phosphor

The procedure of Example 1 was repeated except that the furnace after the second evacuation was filled with oxygen gas of not 133 Pa but 399 Pa, to prepare europium activated cesium bromide phosphor particles.

EXAMPLE 5

Preparation of CsBr:0.01Eu Phosphor

The procedure of Example 1 was repeated except that the furnace after the first evacuation was filled with hydrogen gas of 39.9 Pa, nitrogen gas was further introduced into the furnace until the inner pressure reached atmospheric pressure, and then the mixture was fired at 500° C. for 2 hours. Thus, europium activated cesium bromide phosphor particles were prepared.

EXAMPLE 6

Preparation of CsBr:0.01Eu Phosphor

The procedure of Example 1 was repeated except that the furnace after the second evacuation was filled with oxygen gas of not 133 Pa but 1330 Pa, to prepare europium activated cesium bromide phosphor particles.

Comparison Ex. 1

Preparation of CsBr:0.00001Eu Phosphor 15 g (0.07 mol) of cesium bromide and 0.0028 g ($7.0 \times 10^{-6}$ mol) of europium bromide were weighed out and mixed in a mixer. The obtained mixture was charged in a quartz container, and placed in an electric furnace. The furnace was then evacuated (first evacuation) and filled with nitrogen gas of atmospheric pressure. After the mixture was fired at 550° C. for 2 hours, the furnace was evacuated. The product in the vacuous furnace was cooled to room temperature, The cooled product was taken out of the furnace, and pulverized by means of a mortar to prepare the titled europium activated cesium bromide phosphor particles.

Evaluation of Produced Phosphor

With respect to each of the stimulable phosphors prepared above, the emission intensity ($I_E$) from $Eu^{2+}$, the coloring intensity ($I_F$) centered at $F(Br^-)$ and the amount of stimulated emission were measured in the following manners to evaluate the phosphor.

(1) Measurement of Emission Intensity ($I_E$) from $Eu^{2+}$

The phosphor particles were packed in a holder having a quartz window, and the instant emission from $Eu^{2+}$ in the phosphor was measured by means of a spectrofluorometer (F-4500, Hitachi, Ltd.). The conditions of the measurement were as follows:

voltage of photomultiplier: 400 V
slit width on excitation side: 2.5 nm slit width on emission side: 2.5 nm
scanning speed: 60 nm/min.
wavelength of exciting rays: 346 mm.

From the measured emission spectrum, the maximum intensity at approx. 450 nm was obtained.

Next, a reference phosphor $(SrCaBa)_5(PO_4)_3Cl:Eu^{2+}$ [NP-105 (trade name), Nichia Chemicals Co., Ltd.], which emits a luminescence in the same wavelength region as the sample phosphor, was packed in the same holder. The reference phosphor was exposed to exciting rays of 370 nm, and the spontaneous emission spectrum was measured in the same manner. From the measured emission spectrum, the maximum intensity of the reference phosphor at approx. 450 nm was obtained.

The maximum intensity of the sample phosphor was normalized and expressed in terms of a relative value provided that the maximum intensity of the reference phosphor was set at 100. Thus, the emission intensity ($I_E$) from $Eu^{2+}$ was obtained.

(2) Measurement of Coloring Intensity ($I_F$) at F(Br⁻) Center

The phosphor particles (200 mg) were uniformly packed in a black cylindrical holder (aperture: 10 mm, depth: 250 μm). A very weak probe rays were applied onto the surface of the phosphor cropped out at the aperture, and light scattered from the phosphor was collected by a photomultiplier (R-1848, Hamamatsu Photonics Co., Ltd.) through an optical filter (O-50, Hoya Corporation) to measure the intensity ($I_o$) of light scattered by the phosphor.

Next, the phosphor was exposed to X-rays (40 kVp, 30 mA) for 20 minutes, and light ($I_o$) scattered from the phosphor was measured in the same manner. From the measured $I_o$ and $I_o$, $-\log(I_o/I_o)$ was calculated to obtain the coloring intensity ($I_F$) centered at F (Br⁻).

(3) Ratio of Emission Strength ($Eu^{3+}/Eu^{2+}$)

A spectrofluorometer (F-4500, Hitachi, Ltd.) was first subjected to the following spectral correction procedures.

1) Correction of Exciting Wavelength

Rhodamine B which was approximately constant in its quantitative efficiency at different wavelengths was incorporated into a quartz cell. In the spectrofluorometer, an exciting spectrum at an emission wavelength of 640 nm was measured to obtain an correction coefficient of exciting wavelength for make the spectrum strengths at different wavelengths. The measurement was performed under the following conditions:

voltage of photomultiplier: 400 V
slit width on excitation side: 5.0 nm
slit width on emission side: 20 nm
scanning speed: 60 nm/min.

2) Correction of Emission Wavelength

A glass diffusion element which is approximately constant in its scattering strength at different wavelengths is subjected to measurement of scattering spectrum in the spectrofluorometer, to obtain an correction coefficient of emission wavelength for make the scattering spectrum strengths at different wavelengths. The measurement was performed under the following conditions:

voltage of photomultiplier: 400 V
slit width on excitation side: 5.0 nm
slit width on emission side: 20 nm
scanning speed: 60 nm/min.

3) Ratio of Emission Strength ($Eu^{3+}/Eu^{2+}$)

The phosphor particles were packed in a holder having a quartz window, and the instant emission from $Eu^{2+}$ in the phosphor was measured by means of the spectrofluorometer. The conditions of the measurement were as follows:

voltage of photomultiplier: 400 V
slit width on excitation side: 2.5 nm
slit width on emission side: 2.5 nm
scanning speed: 60 nm/min.
wavelength of exciting rays: 346 nm.

From the measured emission spectrum, the maximum intensity at approx. 450 nm was obtained.

Next, the phosphor was exposed to exciting rays of 394 nm under the same conditions, and the spontaneous emission spectrum was measured at approx. 595 nm in the same manner.

The strength of exciting light at each wavelength and the strength of emission light at each wavelength were corrected using the above-obtained correction coefficiencies. Then, a ratio of the emission strength of $Eu^{3+}$ to the emission strength of $Eu^{2+}$ was calculated to give the desired $Eu^{3+}/Eu^{2+}$.

(4) Stimulated Emission

The phosphor particles (200 mg) were uniformly packed in a black cylindrical holder (aperture: 10 mm, depth: 250 μm). In a dark room, X-rays (80 kVp) from an X-ray generator (MG164, Phillips) were applied in the amount of 100 mR through an Al filter of 3 mm thick onto the surface of the phosphor cropped out at the aperture. After the phosphor was left for 20 seconds, light (660 nm, 4.3 J/m²) from a semiconductor laser (ML-1016R, Mitsubishi Electric Co.) was evenly applied onto the phosphor surface to cause stimulated emission. The stimulated emission was collected by a photomultiplier (R-1848, Hamamatshu Photonics Co., Ltd.) through an optical filter (B-410, Hoya Corporation) to measure the amount of stimulated emission.

Figure 2:
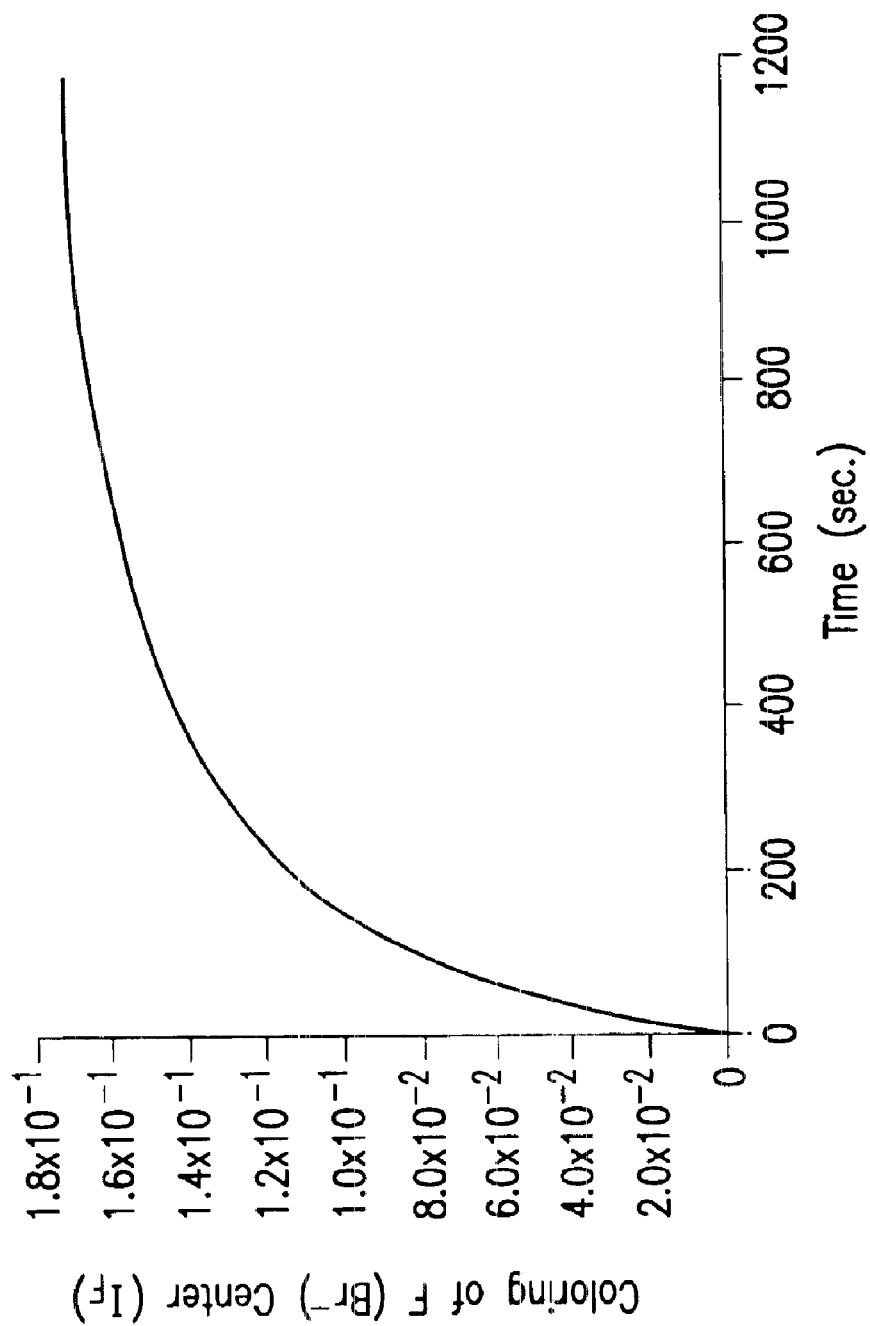
FIG. 2 shows a relationship between the coloring intensity at $F(Br^-)$ center and the period of time for exposing CsBr:0.01Eu phosphor to X-rays.

With respect to CsBr:0.01Eu phosphor, the emission spectrum from $Eu^{2+}$ in the phosphor and the relationship between the coloring intensity ($I_F$) at F(Br⁻) center and the exposure to X-rays are shown in FIGS. 1 and 2, respectively. The results of the above evaluations are set forth in FIGS. 3 and 5 and Tables 1 to 3.

An emission spectrum from $Eu^{2+}$ in CsBr:0.001Eu phosphor of the invention is shown in FIG. 1.

A relationship between the coloring intensity centered at F(Br⁻) and the period of time for exposing CsBr:0.01Eu phosphor to X-rays is shown in FIG. 2.

Figure 3:
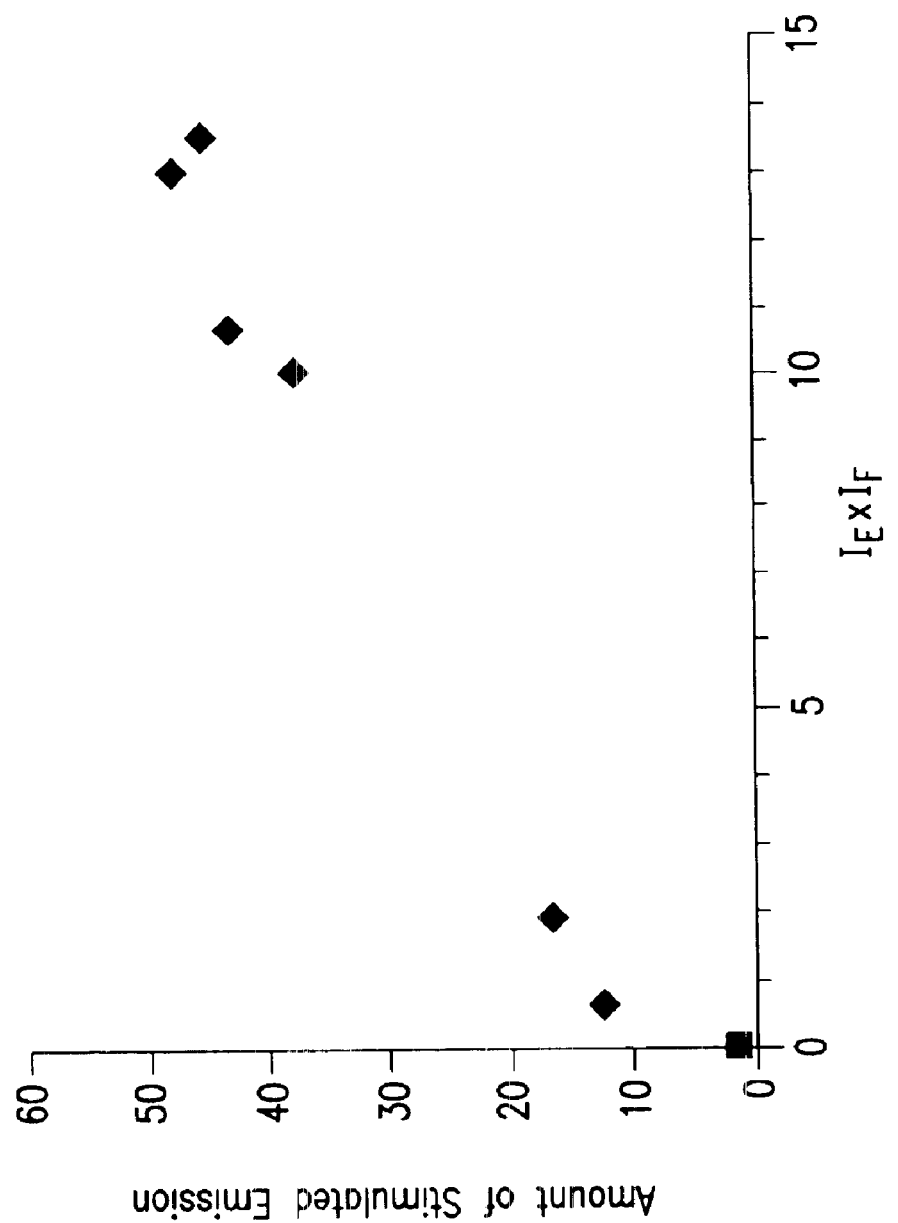
FIG. 3 shows a relationship between $I_H \times I_F$ and the amount of stimulated emission.

A relationship between the value of $I_E \times I_F$ and the amount of stimulated emission is shown in FIG. 3.

Figure 4:
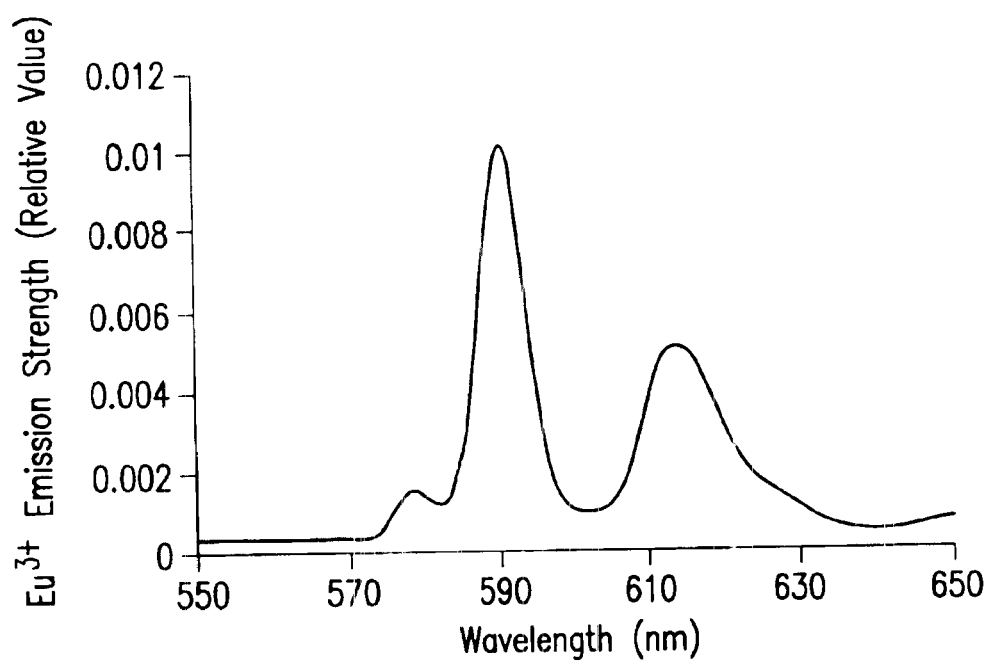
FIG. 4 shows an emission spectrum from $Eu^{3+}$ in CsBr:0.01Eu phosphor of the invention.

An emission spectrum from $Eu^{3+}$ in CsBr:0.01Eu phosphor of the invention is shown in FIG. 4.

Figure 5:
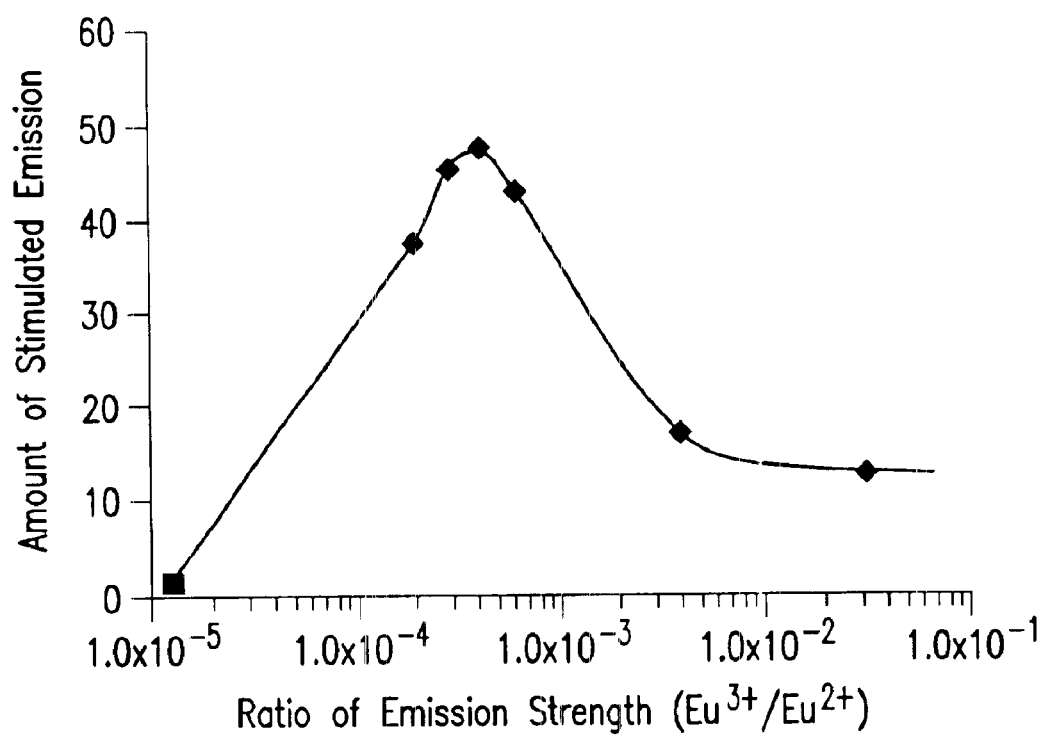
FIG. 5 shows a relationship between the ratio of emission strength ($Eu^{3+}/Eu^{2+}$) and the amount of stimulated emission.

A relationship between the ratio of emission strength ($Eu^{3+}/Eu^{2+}$) and the amount of stimulated emission is shown in FIG. 5.

TABLE 1

| | | firing condition | |
|---|---|---|---|
| | phosphor | temperature | atmosphere |
| Ex. 1 | CsBr:0.01Eu | 525° C. | $N_2$ ($O_2$:133 Pa) |
| Ex. 2 | CsBr:0.01Eu | 525° C. | $N_2$ ($O_2$:266 Pa) |
| Ex. 3 | CsBr:0.01Eu | 525° C. | $N_2$ |
| Ex. 4 | CsBr:0.01Eu | 525° C. | $N_2$ ($O_2$:399 Pa) |
| Ex. 5 | CsBr:0.01Eu | 500° C. | $N_2$ ($H_2$:39.9 Pa) |
| Ex. 6 | CsBr:0.01Eu | 525° C. | $N_2$ ($O_2$:1330 Pa) |
| C. Ex. 1 | CsBr:0.0001Eu | 550° C. | $N_2$ |

TABLE 2

|  | $I_E$ | $I_F$ | $I_E \times I_F$ | stimulated emission |
|---|---|---|---|---|
| Ex. 1 | 56 | 0.1799 | 10.0 | 37.7 |
| Ex. 2 | 51 | 0.2639 | 13.5 | 45.2 |
| Ex. 3 | 55 | 0.2362 | 13.0 | 47.6 |
| Ex. 4 | 47 | 0.2245 | 10.6 | 43.1 |
| Ex. 5 | 11 | 0.1679 | 1.9 | 16.9 |
| Ex. 6 | 2 | 0.2635 | 0.6 | 12.6 |
| C. Ex. 1 | 2 | 0.1237 | 0.1 | 1.5 |

It is evident from FIG. 3 and Table 2 that the europium activated cesium bromide phosphors of the invention (Examples 1 to 6), which showed products of the emission intensity ($I_E$) from $Eu^{2+}$ and the coloring intensity ($I_F$) at $F(Br^-)$ center in the range of more than 0.2, emitted much more amount of stimulated emission than the phosphor for comparison (Comparison example 1). In particular, the phosphors showing $I_E \times I_F$ of more than 10.0 (Examples 1 to 4) emitted very much amounts of stimulated emission. The value of $I_E \times I_F$ can be controlled by properly setting the temperature and the atmosphere of firing procedure, as shown in FIG. 1.

TABLE 3

|  | Emission $Eu^{2+}$ | Strength $Eu^{3+}$ | Ratio $Eu^{3+}/Eu^{2+}$ | stimulated emission |
|---|---|---|---|---|
| Ex. 1 | 56 | 0.010 | $1.9 \times 10^{-4}$ | 37.7 |
| Ex. 2 | 51 | 0.014 | $2.9 \times 10^{-4}$ | 45.2 |
| Ex. 3 | 55 | 0.022 | $4.0 \times 10^{-4}$ | 47.6 |
| Ex. 4 | 47 | 0.029 | $6.1 \times 10^{-4}$ | 43.1 |
| Ex. 5 | 11 | 0.044 | $3.9 \times 10^{-3}$ | 16.9 |
| Ex. 6 | 2 | 0.073 | $3.1 \times 10^{-2}$ | 12.6 |
| C. Ex. 1 | 2 | $2.6 \times 10^{-5}$ | $1.3 \times 10^{-5}$ | 1.5 |

It is evident from FIG. 5 and Table 3, the europium activated cesium bromide phosphors of the invention which show the $Eu^{3+}/Eu^{2+}$ ratios in the range of $5 \times 10^{-5}$ to 0.1 (Examples 1 to 6) give an apparently increased ant of stimulated emission, as compared with the phosphor of Comparison example 1. Particularly, when the $Eu^{3+}/Eu^{2+}$ ratio is in the range of $1 \times 10^{-4}$ to $1 \times 10^{-2}$, the stimulated emission is given in a prominently large amount.

The europium activated cesium bromide phosphors of the invention which have the specific $Eu^{3+}/Eu^{2+}$ ratio can be prepared by adjusting the firing temperature and the firing atmosphere.

EXAMPLE 7

Preparation of Radiation Image Storage Sheet (1) Preparation of Evaporation Source 100 g (0.47 mol) of cesium bromide and 3.18404 g ($4.7 \times 10^{-3}$ mol) of europium bromide were mixed and pulverized in a mortar, and further mixed and stirred in a stirring shaker for 15 minutes. The obtained mixture was placed in an electric furnace. The furnace was then evacuated (first evacuation) for 3 minutes, and filled with nitrogen gas of atmospheric pressure. After the mixture was fired at 525° C. for 2 hours, the furnace was evacuated again for 15 minutes. The product in the vacuous furnace was cooled to room temperature. The obtained europium activated cesium bromide phosphor (CsBr:0.01Eu) was pulverized in a mortar, and pressed by 950 kg/cm² to prepare a tablet as an evaporation source. The tablet was degassed at 150° C. for 2 hours.

(2) Formation of Phosphor Film

An aluminum sheet was washed with methyl ethyl ketone, cleaned with ultraviolet rays and ozone, and dried in a clean booth. Independently, a glass sheet and a quartz sheet were washed with an alkali, and dried in the clean booth. These sheets were used as supports. Each support was placed in a container of vacuum evaporation apparatus, and the prepared evaporation source was set at a predetermined position. After the container is evacuated to $4.0 \times 10^{-4}$ Pa, an electron beam (28 mA) generated by an electron gun at an accelerating voltage of 4.0 kV was applied on the source for 16 minutes. By exposing to the electron beam, the stimulable phosphor was evaporated and deposited on the surfaces of the supports at the deposition rate of 25 μm/min. After the evaporation was complete, air was introduced into the apparatus until the inner pressure reached atmospheric pressure. The supports were then taken out of the apparatus. On the surface of each sheet, a phosphor film (thickness: 400 μm) in which prismatic crystals (width: 30 μm, length: 400 μm) of the phosphor thickly stood together in large numbers was thus formed.

Thus, a radiation image storage sheet comprising a support and a phosphor layer according to the invention was produced.

What is claimed is:

1. An europium activated cesium bromide phosphor having the formula (I):

$$CsBr:xEu \qquad (I)$$

in which x is a number satisfying the condition of $0 < x \leq 0.2$, wherein a relationship between an emission intensity of $Eu^{2+}$ and a coloring intensity at $F(Br^-)$ center satisfies the following condition:

$$0.2 \leq I_E \times I_F$$

in which $I_E$ and $I_F$ represent the emission intensity and the coloring intensity, respectively.

2. The europium activated cesium bromide phosphor of claim 1, which is in the form of prismatic crystals.

3. The europium activated cesium bromide phosphor of claim 1, wherein the relationship between the emission intensity of $Eu^{2+}$ and a coloring intensity at $F(Br^-)$ center satisfies the following condition:

$$0.5 \leq I_E \times I_F \leq 30.0$$

in which $I_E$ and $I_F$ represent the emission intensity and the coloring intensity, respectively.

4. The europium activated cesium bromide phosphor of claim 1, wherein a ratio of $Eu^{3+}$ to $Eu^{2+}$ contained in the phosphor in terms of emission intensity satisfies the following condition:

$$5 \times 10^{-5} \leq Eu^{3+}/Eu^{2+} \leq 0.1.$$

5. The europium activated cesium bromide phosphor of claim 4, wherein a ratio of $Eu^{3+}$ to $Eu^{2+}$ contained in the phosphor in terms of emission intensity satisfies the following condition:

$$1 \times 10^{-4} \leq Eu^{3+}/Eu^{2+} \leq 1 \times 10^{-2}.$$

6. A radiation image storage sheet comprising the europium activated cesium bromide phosphor of claim 1.

7. The radiation image storage sheet of claim 6, wherein the europium activated cesium bromide phosphor in the form of prismatic crystals is provided according to a vapor-phase accumulation method to form a phosphor film.

8. The radiation image storage sheet of claim 6, wherein the europium activated cesium bromide phosphor is dispersed in a binder polymer to form a phosphor film.

9. An europium activated cesium bromide phosphor having the formula (I):

$$CsBr:xEu \qquad (I)$$

in which x is a number satisfying the condition of $0 < x \leq 0.2$, wherein a ratio of $Eu^{3+}$ to $Eu^{2+}$ contained in the phosphor in terms of emission intensity satisfies the following condition:

$$5 \times 10^{-5} \leq Eu^{3+}/Eu^{2+} \leq 0.1.$$

10. The europium activated cesium bromide phosphor of claim 9, which is in the form of prismatic crystals.

11. The europium activated cesium bromide phosphor of claim 9, wherein a ratio of $Eu^{3+}$ to $Eu^{2+}$ contained in the phosphor in terms of emission intensity satisfies the following condition:

$$1 \times 10^{-4} \leq Eu^{3+}/Eu^{2+} \leq 1 \times 10^{-2}.$$

12. A radiation image storage sheet comprising the europium activated cesium bromide phosphor of claim 9.

13. The radiation image storage sheet of claim 12, wherein the europium activated cesium bromide phosphor in the form of prismatic crystals is provided according to a vapor-phase accumulation method to form a phosphor film.

14. The radiation image storage sheet of claim 12, wherein the europium activated cesium bromide phosphor is dispersed in a binder polymer to form a phosphor film.

* * * * *